(12) United States Patent
Laureano et al.

(10) Patent No.: US 11,459,895 B2
(45) Date of Patent: Oct. 4, 2022

(54) TURBINE BLADE COOLING HOLE FOR SIDE WALL

(71) Applicant: United Technologies Corporation, Farmington, CT (US)

(72) Inventors: Pedro David Laureano, Jacksonville, FL (US); John A. Lucena, Aguadilla, OR (US)

(73) Assignee: Raytheon Technologies Corporation, Farmington, CT (US)

( * ) Notice: Subject to any disclaimer, the term of this patent is extended or adjusted under 35 U.S.C. 154(b) by 190 days.

(21) Appl. No.: 16/848,180

(22) Filed: Apr. 14, 2020

(65) Prior Publication Data

US 2021/0317746 A1 Oct. 14, 2021

(51) Int. Cl.
*F01D 5/18* (2006.01)
*F02C 7/18* (2006.01)

(52) U.S. Cl.
CPC .............. *F01D 5/18* (2013.01); *F02C 7/18* (2013.01); *F05D 2240/81* (2013.01)

(58) Field of Classification Search
CPC ........... F01D 5/18; F05D 2240/81; F02C 7/18
See application file for complete search history.

(56) References Cited

U.S. PATENT DOCUMENTS

| | | | |
|---|---|---|---|
| 7,244,101 B2 * | 7/2007 | Lee .................. | F01D 5/082 416/97 R |
| 8,529,194 B2 | 9/2013 | Ammann et al. | |
| 9,249,673 B2 | 2/2016 | Ellis et al. | |
| 10,180,067 B2 | 1/2019 | Beattie et al. | |
| 10,196,903 B2 | 2/2019 | Benson et al. | |
| 10,364,682 B2 | 7/2019 | Hough et al. | |
| 2007/0253816 A1 | 11/2007 | Walz et al. | |
| 2014/0000282 A1 * | 1/2014 | Zelesky .................. | F01D 5/085 60/806 |
| 2018/0187554 A1 | 7/2018 | Hough et al. | |
| 2018/0306058 A1 * | 10/2018 | Lewis .................. | F01D 25/12 |

OTHER PUBLICATIONS

European Search Report for EP Application No. 21168216.6 dated Aug. 25, 2021.

* cited by examiner

*Primary Examiner* — Katheryn A Malatek
(74) *Attorney, Agent, or Firm* — Carlson, Gaskey & Olds, P.C.

(57) ABSTRACT

A turbine blade includes an airfoil including a pressure side and a suction side. A platform includes a pressure side wall and a suction side wall, and has a leading edge end wall and a trailing edge end wall. A pocket is positioned under the platform on the pressure side. A hole has a first end communicating with the pocket and having a second end communicating with the pressure side wall. A gas turbine engine is also disclosed.

20 Claims, 6 Drawing Sheets

TURBINE BLADE COOLING HOLE FOR SIDE WALL

BACKGROUND

This application relates to a cooling hole for cooling a gas turbine engine turbine blade side wall.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands across the turbine section to drive the compressor and the fan section.

The turbine section is subject to high temperature. A turbine typically include a disk with a plurality of circumferentially spaced blades having an airfoil and a platform. A root extends beneath the platform and secures the turbine blade within the disk.

Cooling holes are placed about the turbine blade, including the airfoil, the platform and the root.

SUMMARY

In a featured embodiment, a turbine blade includes an airfoil including a pressure side and a suction side. A platform includes a pressure side wall and a suction side wall, and has a leading edge end wall and a trailing edge end wall. A pocket is positioned under the platform on the pressure side. A hole has a first end communicating with the pocket and having a second end communicating with the pressure side wall.

In another embodiment according to the previous embodiment, the hole extends along a direction defining an angle relative to the pressure side wall. The angle is between 5 and 30 degrees.

In another embodiment according to any of the previous embodiments, the second end is elongated.

In another embodiment according to any of the previous embodiments, the first end is elongated.

In another embodiment according to any of the previous embodiments, a radially inwardly extending extension extends from a radially inner face of the platform and defines a space. The second end is spaced toward the trailing edge end wall relative to the radially inwardly extending extension.

In another embodiment according to any of the previous embodiments, a radially inwardly extending extension extends from a radially inner face of the platform and defines a space. The second end is spaced toward the trailing edge end wall relative to the radially inwardly extending extension.

In another embodiment according to any of the previous embodiments, the second end is elongated.

In another embodiment according to any of the previous embodiments, the first end is elongated.

In another embodiment according to any of the previous embodiments, the second end is elongated.

In another embodiment according to any of the previous embodiments, the first end is elongated.

In another featured embodiment, a gas turbine engine includes a compressor section compressing air and delivers it into a combustor section. A turbine section is downstream of the combustor section. The turbine section includes a high pressure turbine rotor having at least one turbine blade. The at least one turbine blade has an airfoil including a pressure side and a suction side. A platform includes a pressure side wall and a suction side wall, and has a trailing edge end wall and a leading edge end wall. A pocket is positioned under the platform on the pressure side. A hole has a first end communicating with the pocket and has a second end communicating with the pressure side wall.

In another embodiment according to the previous embodiment, the hole extends along a direction defining an angle relative to the pressure side wall. The angle is between 5 and 30 degrees.

In another embodiment according to any of the previous embodiments, the second end is elongated.

In another embodiment according to any of the previous embodiments, the first end is elongated.

In another embodiment according to any of the previous embodiments, a radially inwardly extending extension extends from a radially inner face of the platform, and defines a space. The second end is spaced toward the trailing edge end wall relative to the radially inwardly extending extension. A vane is positioned downstream of the at least one turbine blade and the vane has an extension extending in an upstream direction to fit within a space defined between the extension and the radially inner surface of the platform.

In another embodiment according to any of the previous embodiments, a radially inwardly extending extension extends from a radially inner face of the platform, and defines a space. The second end is spaced toward the trailing edge end wall relative to the radially inwardly extending extension. A vane is positioned downstream of the at least one turbine blade and the vane having an extension extending in an upstream direction to fit within a space defined between the extension and the radially inner surface of the platform.

In another embodiment according to any of the previous embodiments, the second end is elongated.

In another embodiment according to any of the previous embodiments, the first end is elongated.

In another embodiment according to any of the previous embodiments, the second end is elongated.

In another embodiment according to any of the previous embodiments, the first end is elongated.

These and other features can be better understood from the specification and drawings.

DETAILED DESCRIPTION

Figure 1:
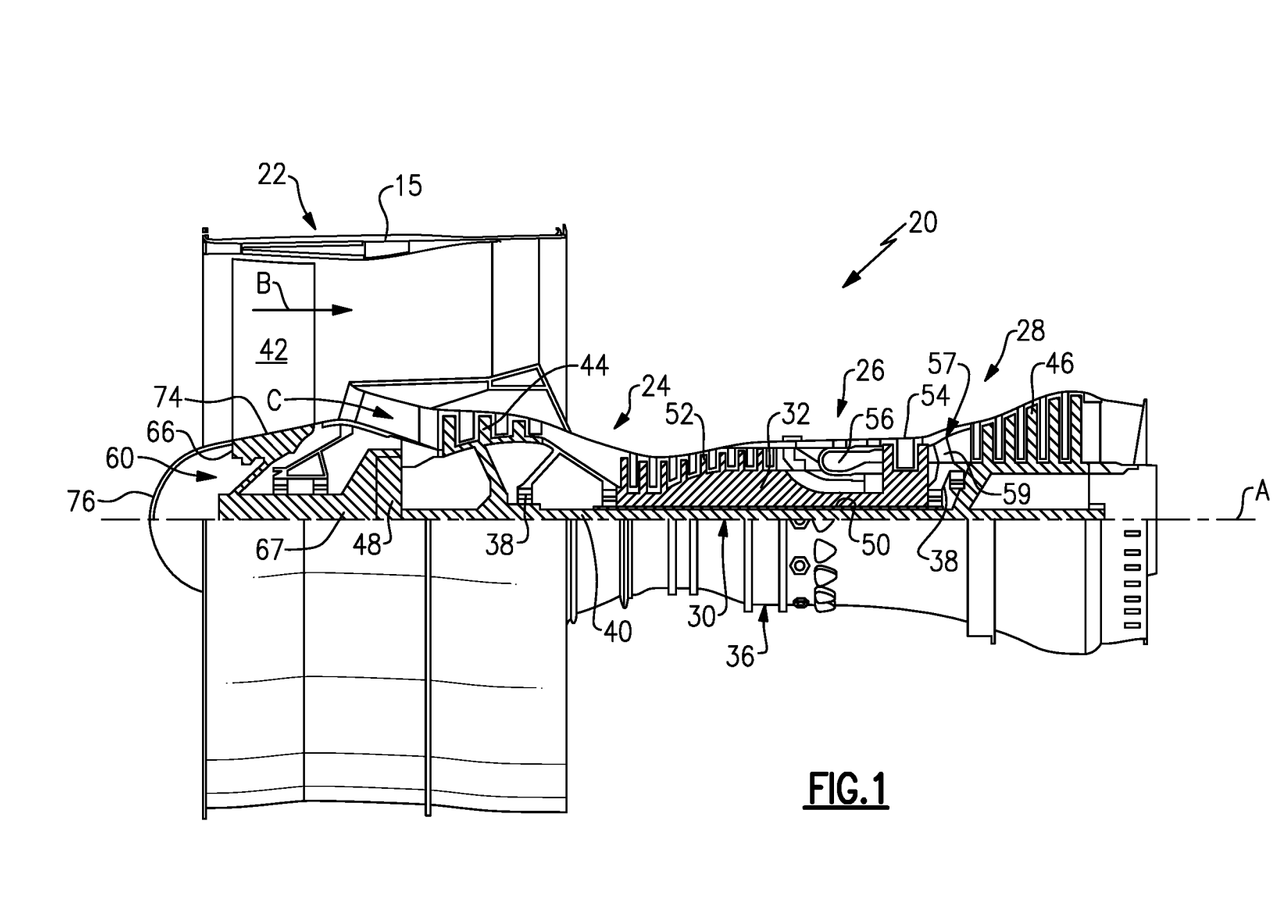
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
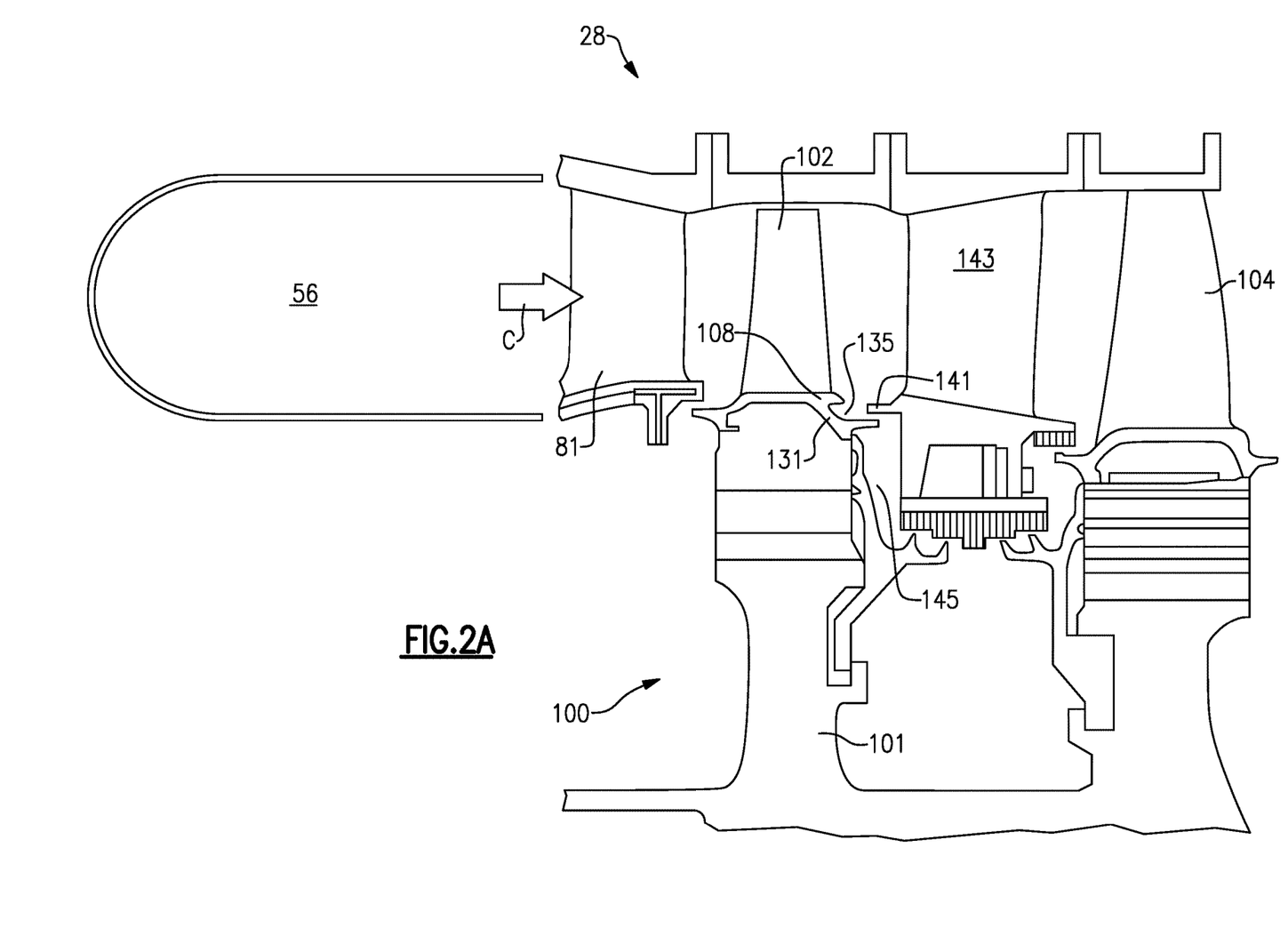
FIG. 2A shows a turbine section.

FIG. 2A shows a turbine section 28. A combustor 56 delivers products of combustion across a vane 81, and a turbine rotor 100. As known, the turbine rotor 100 includes a disk 101 receiving a first stage turbine blades 102, and a second stage turbine blades 104.

The turbine blade 102 is shown highly schematic in this Figure. However, a feature known as a "fish mouth" is shown at 135. A radially inward extension 131 extends inwardly from platform 108 to an inner hook portion that forms the space 135. An extension 141 from a downstream vane 143 extends into the space 135. This figure is somewhat schematic. This structure is shown with more detail in FIG. 4. Air from a chamber 145 is driven outwardly through the torturous path between the extension 141 and the extension 131, and through the fish mouth space 135. This pressurized air resists the flow of the products of combustion C passing radially inwardly at this location.

Figure 2B:
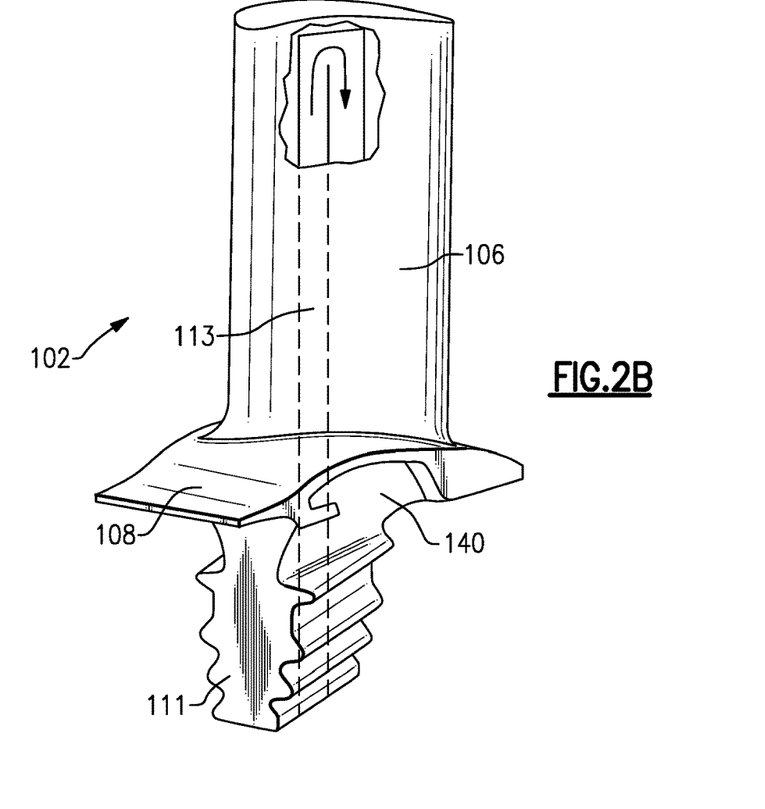
FIG. 2B shows a typical turbine blade.

FIG. 2B schematically shows a first stage turbine blade 102. As shown, the turbine blade 102 has an airfoil 106 extending radially outwardly of a platform 108. A root or fir tree 111 secures the turbine blade 102 in the disk 101 of the rotor 100. As shown schematically, cooling air 113 is circulated throughout the blade 102. A pressure side pocket 140 is also shown. As with the structure of FIG. 2A, the pocket shown in FIG. 2B is somewhat schematic. This pocket is shown with more detail in FIGS. 4 and 5.

Figure 2C:
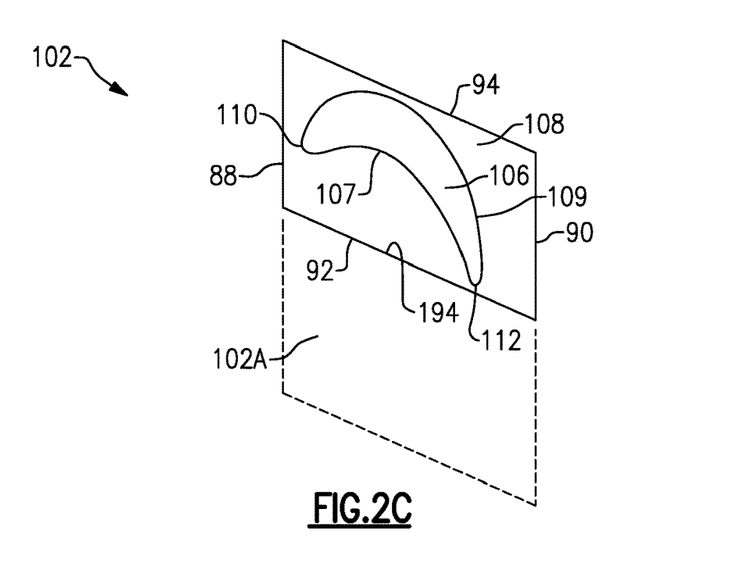
FIG. 2C is a top view of a turbine blade.

FIG. 2C shows the turbine blade platform 108 having leading edge wall 88 and trailing edge wall 90. There is a pressure side wall 92 and a suction side wall 94. The airfoil 106 extends from a leading edge 110 to a trailing edge 112. Airfoil 106 has a pressure side 107 and a suction side 109. As shown somewhat schematically, there is a circumstantially spaced blade 102A adjacent to the pressure side wall 92. Details of this disclosure extend to a manner of providing cooling air to the area between the pressure side wall 92 and suction side wall 194 of the adjacent blade 102A.

While this application discloses a first stage turbine blade for a high pressure turbine section, details of the disclosed cooling hole may benefit turbine blades at other locations.

Figures 3A, 3B:
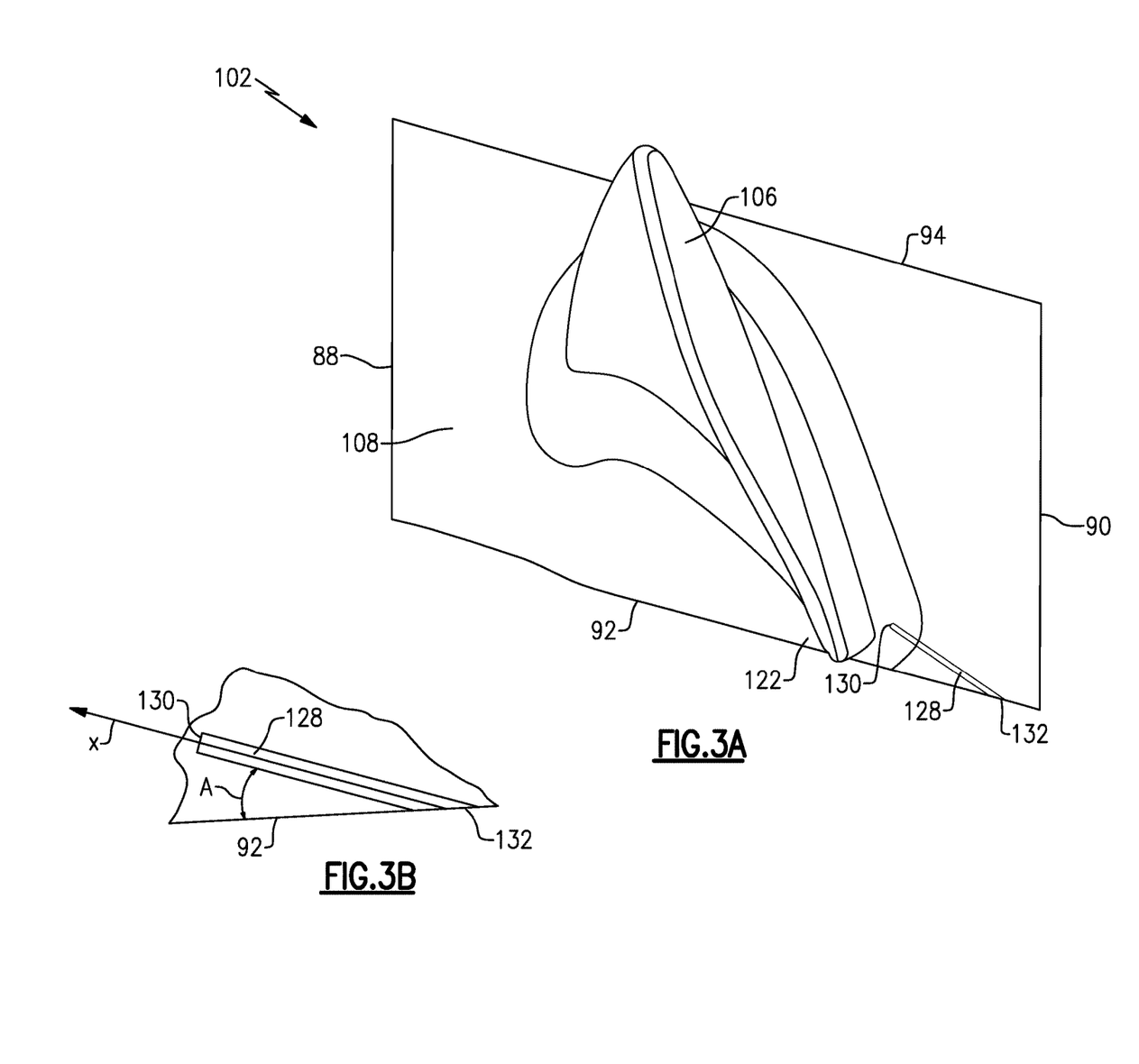
FIG. 3A illustrates a top view of an example blade.
FIG. 3B shows a detail of a cooling hole in the blade of FIG. 3A.

FIG. 3A shows a turbine blade 102. As shown, the airfoil 106 extends upwardly of platform 108.

Cooling holes are formed about the airfoil and platform. This disclosure relates to a cooling hole 128 that goes from pocket 140 (See FIGS. 4 and 5) underneath the platform 108 to provide cooling air to the pressure side wall 92 and to flow towards a trailing edge wall 90. The air also cools the suction side wall 94 of adjacent blade 102A. The cooling hole 128 has a first end 130 that communicates with the pocket, and a second end 132 at the side wall 92.

Cooling holes have been provided to the side wall 92 in the past, however, they have tended to come from the suction side. Such holes have been relatively long, and connect to the trailing edge side wall 92 at a steep angle.

As shown in FIG. 3B, the cooling hole 128 extends along a direction X between ends 132 and 130 that is spaced from the side wall 92 by an angle A.

In embodiments, the angle may be between 5 and 30 degrees.

Figure 4:
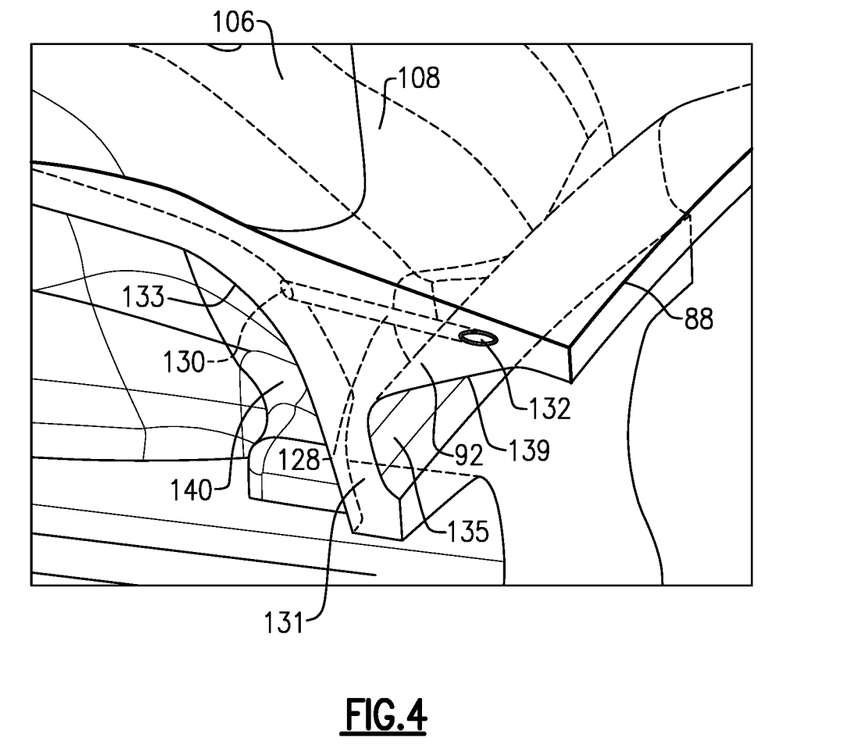
FIG. 4 illustrates a close up view of a side of blade of FIG. 3A.

FIG. 4 shows details of the pocket 140, which is underneath the platform 108. The pocket 140 is on the pressure side of the airfoil 106.

It should be understood that since the cooling hole enters the pocket 140 at an angle, and connects through side wall 92 at an angle, the hole will not be cylindrical at either of the ends 130 and 132, but will instead be elongated or oval.

The fish mouth 135 is illustrated in this Figure. As shown, the extension 131 extends radially inwardly from the platform 108. The fish mouth 135 is formed between a radially inner sloping portion 139 of the platform 108 and the extension 131. As can be appreciated, the second end 132 of hole 128 on the side wall 92 will be closer to the trailing edge 88 than is the extension 131. The end 130 of the cooling hole 128 is within a curving inner wall 133 defining the pressure side pocket 140.

By having the angle A be relatively small better flow distribution is achieved at the side wall 92.

Figure 5:
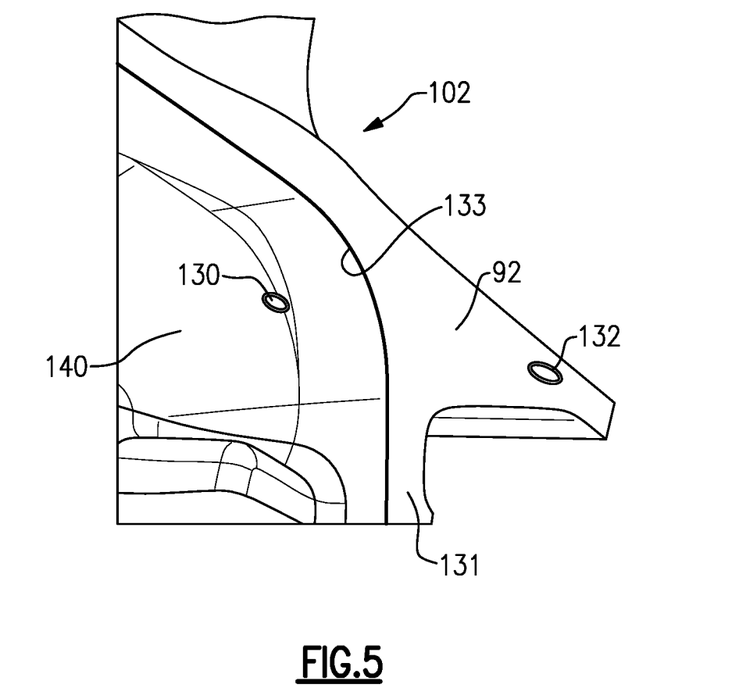
FIG. 5 illustrates another close up view of the blade of FIG. 3A.

FIG. 5 shows the side wall 92, the pocket 140, and the ends 130 and 132.

The cooling hole 128 thus reliably supplies air to the side wall 92, and in a direction towards the trailing edge 88.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A turbine blade comprising:
an airfoil including a pressure side and a suction side;
a platform including a pressure side wall, a suction side wall, a leading edge end wall, a trailing edge end wall, a top wall, and a bottom wall;
a root extending from the bottom wall;
a pressure side pocket positioned under the platform on the pressure side and exterior to the root; and
a hole having a first end in the pressure side pocket and having a second end in the pressure side wall.

2. The turbine blade as recited in claim 1, wherein the hole extending along a direction defining an angle relative to the pressure side wall, said angle being between 5 and 30 degrees.

3. The turbine blade as recited in claim 2, wherein said second end is elongated.

4. The turbine blade as recited in claim 3, wherein said first end is elongated.

5. The turbine blade as recited in claim 4, wherein a radially inwardly extending extension extends from a radially inner face of said platform, and to define a space, and said second end being spaced toward said trailing edge end wall relative to said radially inwardly extending extension.

6. The turbine blade as recited in claim 1, wherein a radially inwardly extending extension extends from a radially inner face of said platform, and to define a space, and said second end being spaced toward said trailing edge end wall relative to said radially inwardly extending extension.

7. The turbine blade as recited in claim 6, wherein said second end is elongated.

8. The turbine blade as recited in claim 7, wherein said first end is elongated.

9. The turbine blade as recited in claim 1, wherein said second end is elongated.

10. The turbine blade as recited in claim 1, wherein said first end is elongated.

11. A gas turbine engine comprising:
a compressor section compressing air and delivering it into a combustor section, and a turbine section downstream of said combustor section, said turbine section including a high pressure turbine rotor having at least one turbine blade;
said at least one turbine blade having an airfoil including a pressure side and a suction side;
a platform including a pressure side wall, a suction side wall, a leading edge end wall, a trailing edge end wall, a top wall, and a bottom wall;
a root extending from the bottom wall;
a pressure side pocket positioned under the platform on the pressure side and exterior to the root; and
a hole having a first end in the pressure side pocket and having a second end in the pressure side wall.

12. The gas turbine engine as recited in claim 11, wherein the hole extending along a direction defining an angle relative to the pressure side wall, said angle being between 5 and 30 degrees.

13. The gas turbine engine as recited in claim 12, wherein said second end is elongated.

14. The gas turbine engine as recited in claim 13, wherein said first end is elongated.

15. The gas turbine engine as recited in claim 14, wherein a radially inwardly extending extension extends from a radially inner face of said platform, and to define a blade space, and said second end being spaced toward said trailing edge end wall relative to said radially inwardly extending extension and wherein a vane is positioned downstream of said at least one turbine blade and said vane having a vane extension extending in an upstream direction to fit within the blade space defined between said radially inwardly extending extension and said radially inner face of said platform.

16. The gas turbine engine as recited in claim 11, wherein a radially inwardly extending extension extends from a radially inner face of said platform, and to define a blade space, and said second end being spaced toward said trailing edge end wall relative to said radially inwardly extending extension and wherein a vane is positioned downstream of said at least one turbine blade and said vane having a vane extension extending in an upstream direction to fit within the blade space defined between said radially inwardly extending extension and said radially inner face of said platform.

17. The gas turbine engine as recited in claim 16, wherein said second end is elongated.

18. The gas turbine engine as recited in claim 17, wherein said first end is elongated.

19. The gas turbine engine as recited in claim 11, wherein said second end is elongated.

20. The gas turbine engine as recited in claim 11, wherein said first end is elongated.

\* \* \* \* \*